No. 876,097. PATENTED JAN. 7, 1908.
A. E. SALISBURY.
ALINING MEANS.
APPLICATION FILED MAR. 21, 1907.

Witnesses
O. B. Baenziger,
E. M. Brown.

Inventor
A. E. Salisbury,
By Edward N. Pagelsen,
Attorney

UNITED STATES PATENT OFFICE.

ALSOM E. SALISBURY, OF TOLEDO, OHIO.

ALINING MEANS.

No. 876,097.
Specification of Letters Patent.
Patented Jan. 7, 1908.

Application filed March 21, 1907. Serial No. 363,566.

*To all whom it may concern:*

Be it known that I, ALSOM E. SALISBURY, a citizen of the United States, and a resident of Toledo, in the county of Lucas and State of Ohio, have invented a new and Improved Alining Means, of which the following is a specification.

My invention relates to means for causing the platforms of weighing trucks to be supported centrally when the parts are in weighing position and thus avoid incorrect weighing because of improper suspension of the platform and levers due to misplacement of the platform.

My invention consists of novel means for causing the platform to rest centrally on the frame of weighing trucks by alining the platform while it is being lowered onto the frame.

It consists more particularly in inclined members secured to the platform, which members are adapted to engage the edges of the truck frame when the platform is being lowered onto the frame, if then out of alinement.

I have illustrated my improvement as applied to the weighing truck shown in the patent to O. W. Parsell, dated July 5th, 1898, No. 606,735, although it is evident that this improvement is applicable to any similar type of weighing truck.

Figure 1:
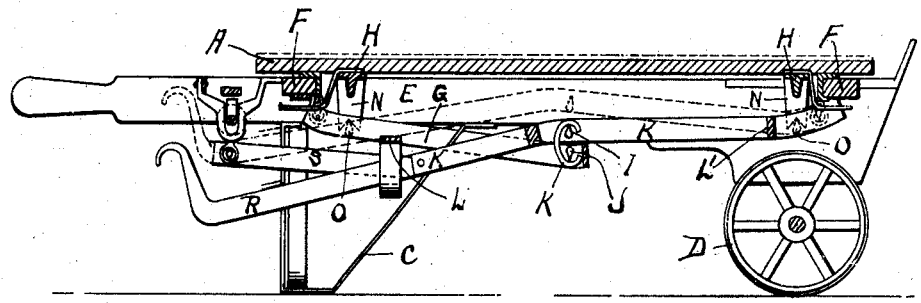
Figure 2:
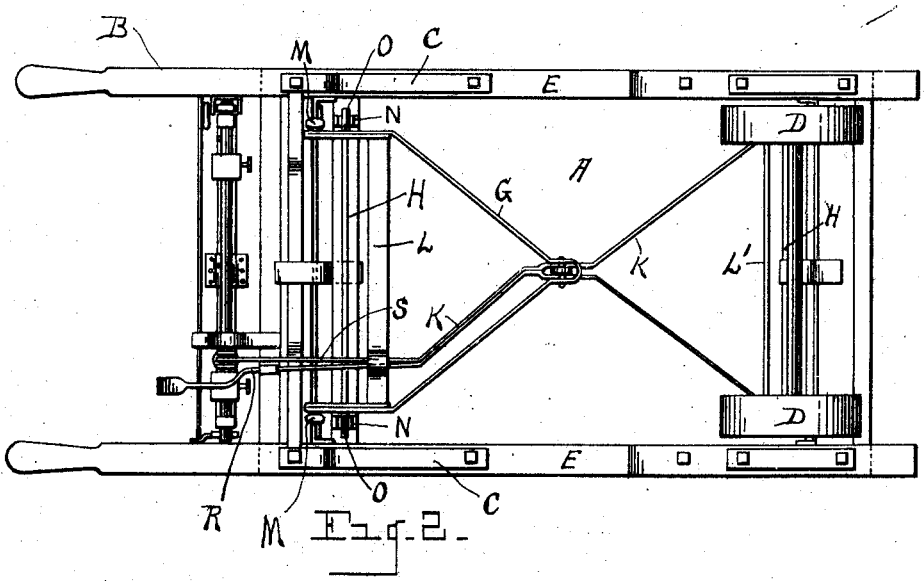
Figure 3:
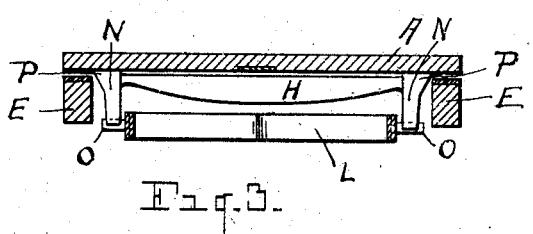

In the accompanying drawing, Figure 1 is a vertical longitudinal cross section and Fig. 2 a plan of weighing truck provided with my improved alining device. Fig. 3 is a transverse cross section showing the alining device.

Similar reference characters refer to like parts throughout the several views.

Weighing trucks are loaded and wheeled about similarly to other trucks, and, excepting when weighing is actually being done, the platform rests on the frame of the truck. There is a constant danger that this platform may move toward one side or the other, resulting in unequal loading of the knife-edges, and often in undesirable friction between the parts. To obviate this, my improved device causes the platform to rest centrally upon the frame; and therefore, the platform will be in alinement with the scale when raised from the frame.

In the drawings, B is the frame of the truck, supported at its forward ends by the wheels D and at the rear end by the legs C.

A is the platform which normally rests on the side pieces E and cross bars F of the frame, and which may be lifted and supported by the scale. levers when used for weighing. These levers G and K are preferably triangular in shape, formed of flat bars of steel extending from the corners of the platform and meeting at the center, as shown in the drawing, being there joined by the knife edges I and J and the link K. Cross bars L and L' form portions of these triangular levers. Rings M are suspended from the cross bars F and support the knife edges at the fulcrum ends of the levers G and K.

Secured to the bottoms of the platform are two cross bars H from which the lugs N extend downward, which lugs are provided with V shaped bearings for the knife edges O carried by the levers G and K. The lugs being integral with the cross bar, the V shaped bearings of each pair will always be in line with each other. Projecting from these lugs are the inclined portions P which are adapted to contact with the side bars E of the truck frame whenever the platform is being lowered when not central with respect to the frame. These inclines serve to move the platform to central position, thus alining it, so that when the platform is raised to weighing position, it will be in central position. When the platform is in its lower position, the inclines will prevent it moving laterally. As these inclines slope inwardly, there is no chance of friction between them and the side when the platform is raised, thus permitting accurate weighing.

The lever K is provided with an arm R by means of which the levers and platform may be lifted when the truck is to be used as a scale. The arm S is provided with a knife-edge which serves as the connection between the levers and the scale beams mounted at the rear end of the truck, which mechanism forms no portion of my invention, and any desired form of scale beam may be employed.

Having now explained my improvements, what I claim as my invention and desire to secure by Letters Patent is—

An alining device for platforms of weighing trucks, the combination with the side bars of the truck frame, of a platform, a cross bar secured thereto, and inclined projections carried by said cross bar and adapted to contact with the inner sides of the side bars of the truck frame and thereby tend to force the platform to central position on the frame.

In testimony whereof I have signed this specification in the presence of two subscribing witnesses.

ALSOM E. SALISBURY.

Witnesses:
JOHN H. RUSSELL,
GEORGE WILSON.